Feb. 25, 1936.  N. T. BRANCHE  2,032,046
CONTROL MECHANISM FOR BURNERS
Filed Nov. 12, 1935
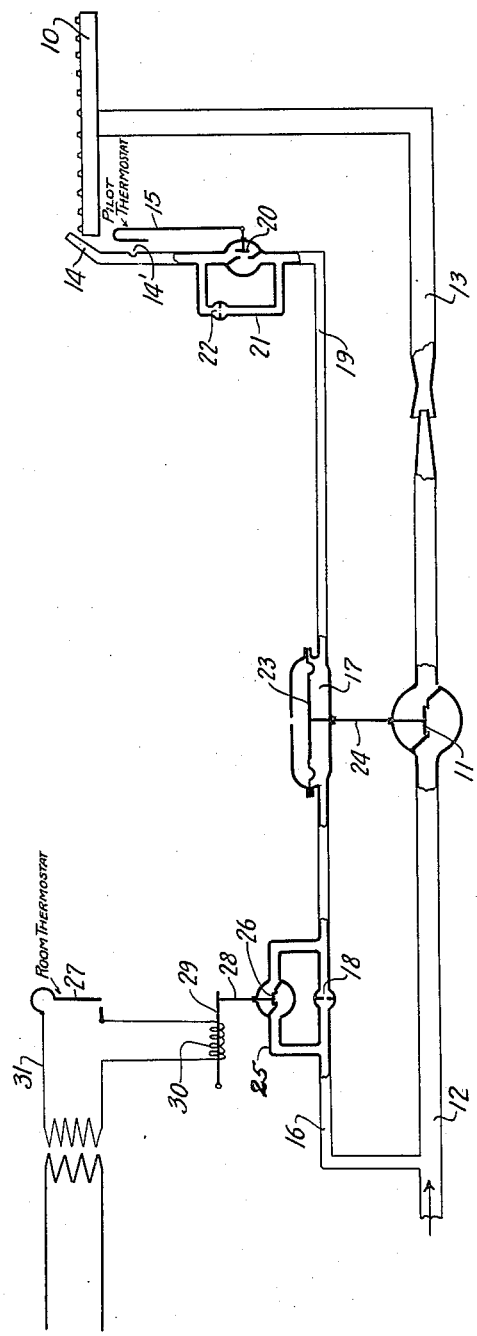
Inventor
N. T. Branche
By Charles A. Lind
Attorney Patented Feb. 25, 1936

2,032,046

UNITED STATES PATENT OFFICE 2,032,046

CONTROL MECHANISM FOR BURNERS

Nelson T. Branche, Toledo, Ohio, assignor to Surface Combustion Corporation, Toledo, Ohio, a corporation of New York Application November 12, 1935, Serial No. 49,337

2 Claims. (Cl. 158—117.1)

The present invention relates to safety control systems for gas burners and has for its object to provide a control system which shall make use of the gas pressure in the gas supply main for opening the main gas valve for the burner. The various features of novelty and invention will appear from the detail description taken in connection with the accompanying drawing forming part of this specification.

In the drawing, the single figure is a more or less diagrammatic representation of the control system embodying the present invention.

10 indicates an ordinary gas burner and 11 a shut-off valve in a gas supply line 12 leading to the burner, said line including an ordinary mixing tube 13 between the burner and said valve. 14 indicates an ordinary pilot for lighting the burner 10 and 15 a thermostat arranged to be heated by flames issuing through a side port 14' of the pilot.

Leading from the gas supply line 12 at a point ahead of the main gas valve 11 is a pipe 16 which delivers to a pressure chamber 17, the pipe having a restricted flow orifice 18; and leading from the pressure chamber to the pilot 14 is a pipe 19 having a valve 20 therein. The valve 20 is coupled to the thermostat 15 for operation thereby, the arrangement being such that when the thermostat is cold the valve will be in open position and when the thermostat is hot the valve will be in closed position; provision, however, being made to permit a limited flow of gas to the pilot even though the valve is closed,—as, for example, by a by-pass 21 around the valve, the by-pass having a restricted flow orifice 22. A diaphragm 23 constitutes one side of the pressure chamber 17; and a stem 24 connects the diaphragm with the shut-off valve 11. At this point it may be stated that the arrangement thus far described is such that so long as the valve 20 is in open position, the pressure on the diaphragm 23 will not be sufficient to cause it to open the shut-off valve 11.

The pipe 16 has a by-pass 25 around the orifice 18 and in the by-pass is a valve 26 which is under the control of a room thermostat 27, the arrangement being such that unless the thermostat calls for the heat the valve 26 will remain closed. The mechanism by means of which the room thermostat controls the valve 26 may take various forms. In the arrangement shown the valve 26 has a stem 28 which is connected to a thermal element 29 adapted, when heated, to open the valve; the element being heated by a wire 30 which forms part of an electric circuit 31 which is normally open unless the room thermostat 27 calls for heat.

The mode of operation is as follows: When the valve 26 in the by-pass 25 is closed, the main gas valve 11 will also be closed. The orifice 18, however, permits a limited amount of gas to flow to the pilot but this limited amount of gas will not be sufficient to heat the pilot thermostat 15 to a sufficiently high temperature to cause it to close the valve 20. Suppose now that the valve 26 opens due to call-for-heat by the room thermostat. Due to the increased flow of gas to the pilot the thermostat 15 will quickly be heated by the gas issuing from the side port 14' of the pilot with the result that the valve 20 will be moved toward closed position, the flow of the gas to the pilot will be limited to such as will flow through the orifice 22, and the back pressure ahead of the latter will be increased sufficiently to operate the diaphragm 23 to open the main gas valve 11. While the valve 26 remains open the gas flowing to the pilot will be sufficient to cause the gas issuing from the side port 14' of the pilot to heat the thermostat 15 to high enough temperature to cause the latter to hold the valve 20 closed whereas closing of the valve 26 will decrease the gas flow to such extent that the thermostat will cool off sufficiently to open the valve 20 with consequent drop in pressure in the chamber 17 whereby the valve 11 will close as will now be readily understood.

The control system has special utility in connection with gas burners for house heating furnaces but is not limited in its application to such use.

What I claim is:

1. In apparatus of the class described, the combination of a main heating burner, a pilot for lighting the main burner, a thermostat arranged to be heated by the pilot, means including a shut-off valve for delivering fuel to the main burner, a gas supply conduit for the pilot, a flow-restricting orifice in said conduit, a by-pass around said orifice, a normally closed valve in said by-pass, means controlled by a temperature condition remote from the main burner for opening the valve in the by-pass whereby to increase the amount of gas flowing to said pilot, a movable flow-restricting means in said conduit at a point between said orifice and said pilot and movable by the said thermostat toward flow-restricting position for decreasing the amount of gas flowing to the pilot consequent on the opening of the valve in said by-pass and to build up back pressure in the conduit, and means dependent on a predetermined back pressure in said conduit for opening said shut-off valve.

2. In apparatus of the class described, the combination of a main heating burner, a pilot for lighting the main burner, a thermostat arranged to be heated by the pilot, means including a shut-off valve for delivering fuel to the main burner, a gas supply conduit for the pilot, a flow-restricting orifice in said conduit, a by-pass around said orifice, a normally closed valve in said by-pass, means controlled by a temperature condition remote from the main burner for opening the valve in the by-pass whereby to increase the amount of gas flowing to said pilot, a movable flow-restricting means in said conduit at a point between said orifice and said pilot and movable by the said thermostat toward flow-restricting position for decreasing the amount of gas flowing to the pilot consequent on the opening of the valve in said by-pass and to build up back pressure in the conduit, and a diaphragm in said conduit for opening said shut-off valve when a predetermined back pressure prevails in the conduit.

NELSON T. BRANCHE.